R. C. GLISE.
LOADING APPARATUS.
APPLICATION FILED DEC. 21, 1908.
947,902.
Patented Feb. 1, 1910.
3 SHEETS—SHEET 3.
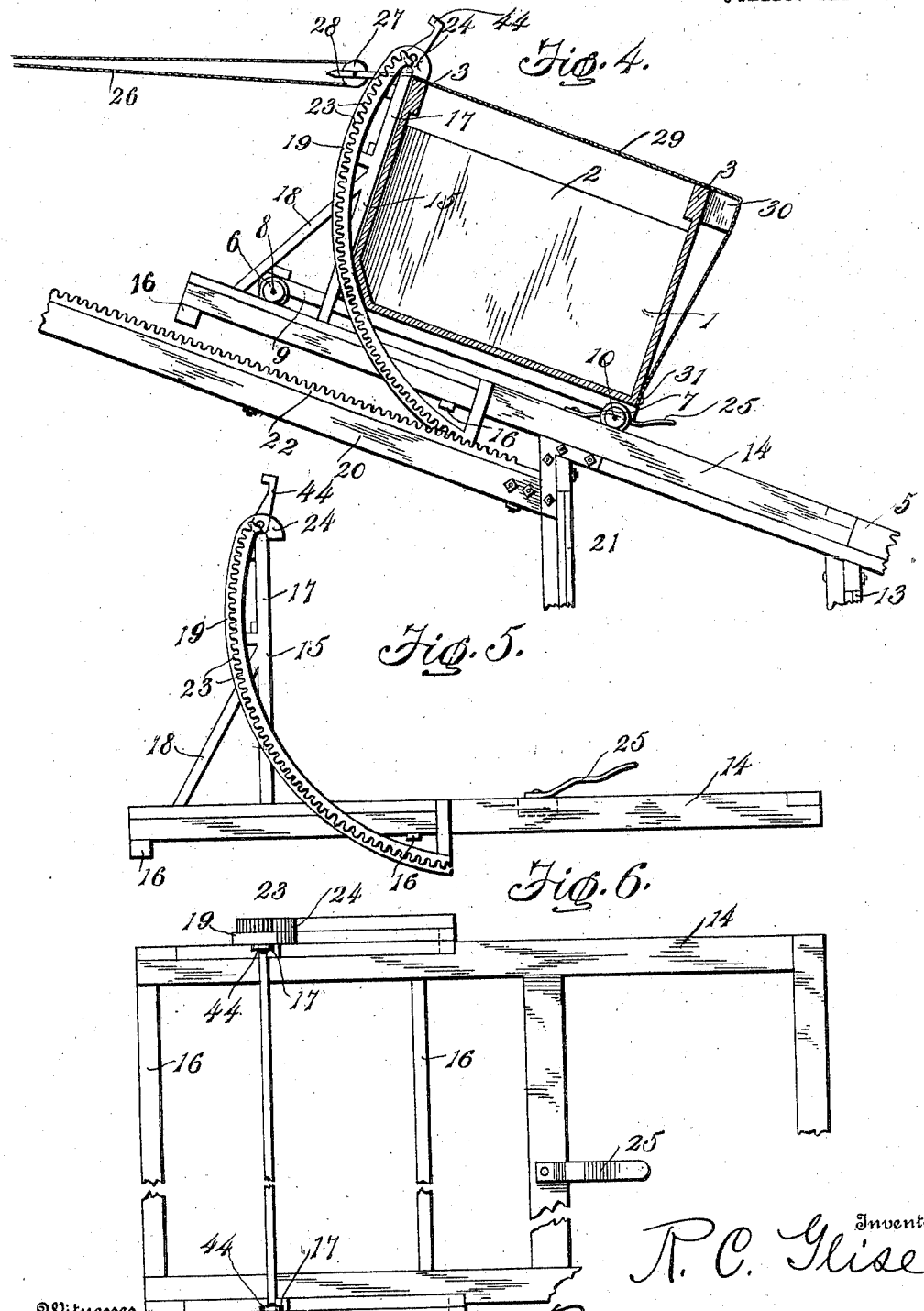

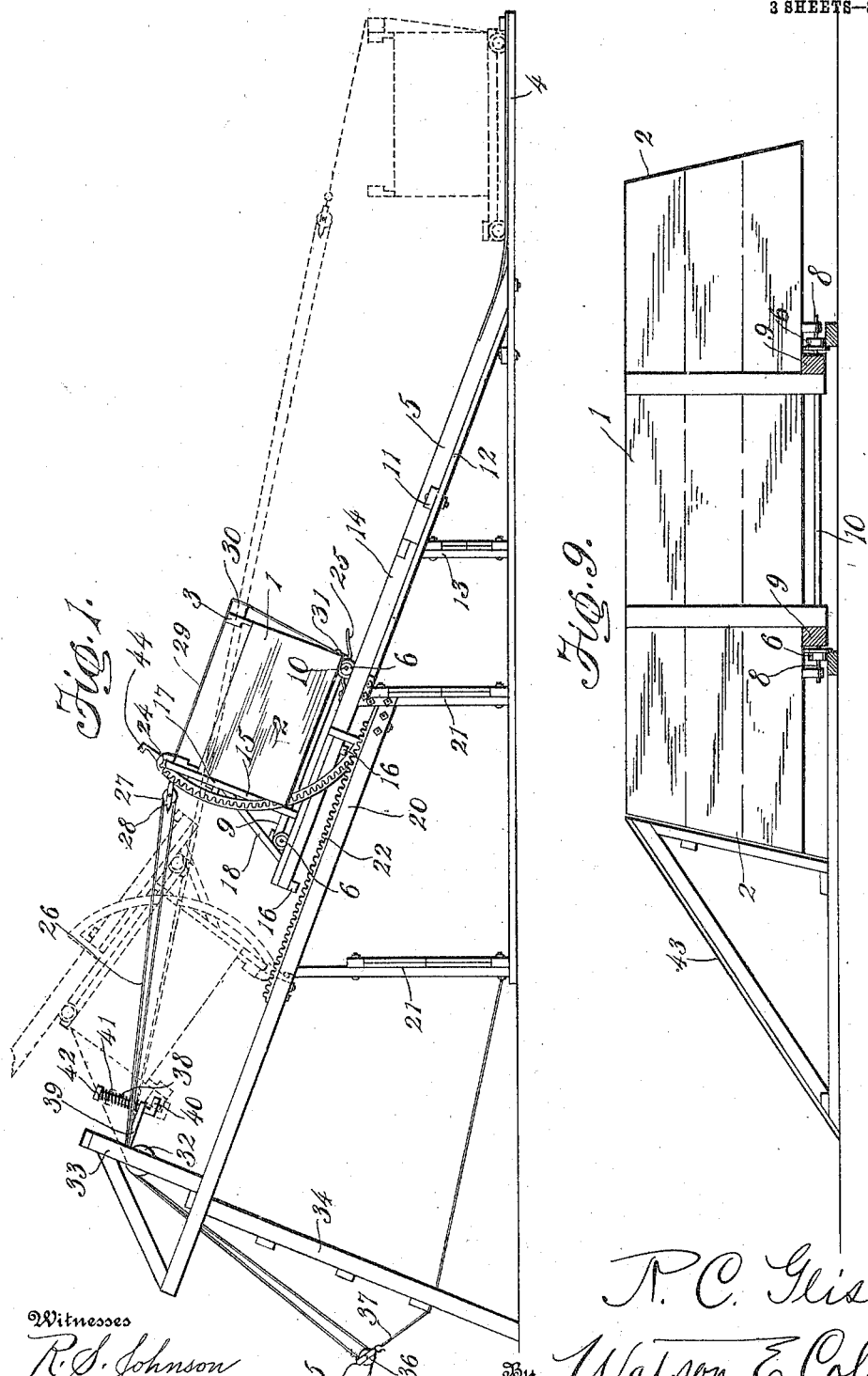

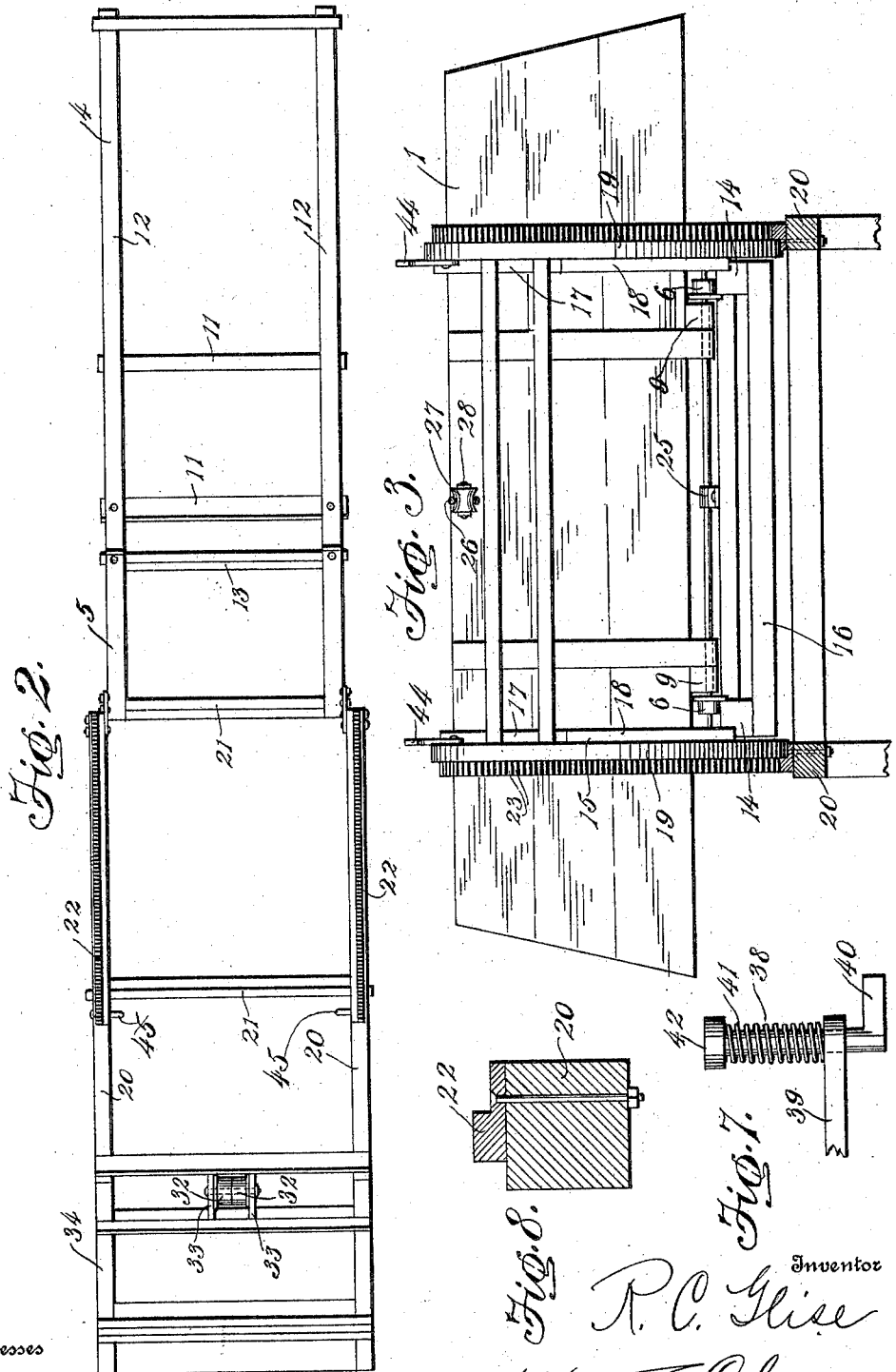

UNITED STATES PATENT OFFICE.

ROY C. GLISE, OF PROSPER, MINNESOTA.

LOADING APPARATUS.

947,902.     Specification of Letters Patent.      Patented Feb. 1, 1910.

Application filed December 21, 1908. Serial No. 468,613.

*To all whom it may concern:*

Be it known that I, ROY C. GLISE, a citizen of the United States, residing at Prosper, in the county of Fillmore and State of Minnesota, have invented certain new and useful Improvements in Loading Apparatus, of which the following is a specification, reference being had to the accompanying drawings.

This invention relates to improvements in apparatus or machines for loading manure into manure or fertilizer spreaders and for analogous purposes.

The object of the invention is to provide a loading apparatus of this character which will be simple, practical, and comparatively inexpensive in construction and which will be rapid, effective and convenient in operation.

With the above and other objects in view, the invention consists of the novel features of construction and the combination and arrangement of parts hereinafter fully described and claimed, and illustrated in the accompanying drawings, in which—

Figure 1 is a side elevation of the improved loading apparatus showing in full lines the dumping box or receptacle in an elevated position about to tilt and in dotted lines said box or receptacle in its tilted or dumping position and also in its lowered position ready for loading; Fig. 2 is a top plan view of the inclined track; Fig. 3 is a detail section taken on the plane indicated by the line 3—3 in Fig. 1; Fig. 4 is an enlarged vertical longitudinal section through the dumping box or receptacle and its tilting support; Figs. 5 and 6 are, respectively, a side elevation and a plan with parts in section of the tilting support for the dumping box or receptacle; Fig. 7 is a detail view showing the spring bumper or cushion for the dumping box or receptacle; Fig. 8 is a detail section through the cog rail or track and its supporting stringer; and Fig. 9 is a cross section through the track for the dumping box or receptacle showing the loading chute or skid.

The invention comprises a box or receptacle 1 of any suitable form and construction and preferably of such capacity that its load will fill a manure spreading machine, a wagon body or the like. Said box 1 is, however, preferably of substantially rectangular shape and has its end walls 2 inclined upwardly and inwardly so that its open top is of less area than its bottom. The side walls 3 of the box are also preferably of greater height than its end walls but, if desired, one end of the box may be open. Said box is adapted to travel upon a track having a level portion 4 and an inclined portion 5; and to permit said box to be readily moved, it is supported by front and rear pairs of flanged rollers 6, 7. The front rollers 6 are journaled upon short shafts 8 mounted in longitudinal beams 9 secured to the bottom of the box and projecting somewhat beyond its front end, as shown in the drawings. The rear track wheels 7 are carried by a transverse shaft 10 which extends between the two longitudinal beams 9, for a purpose presently explained.

The tracks 4, 5 may be of any suitable form and construction but, as illustrated, they consist merely of bars or beams connected together by cross bars 11 and arranged upon longitudinal stringers 12, the inclined portion 5 of the track being supported by one or more upright bracing frames 13 according to the length of such inclined portion or section. These stringers 12 of the inclined portion 5 of the track project beyond the upper ends of the track bars and serve to support track sections 14 which form a part of a tilting or rocking support 15 adapted to receive the loading or dumping box 1 and to swing the same over to an inverted position so that it will discharge its contents into a manure spreader, wagon or the like. Said support 15, as more clearly shown in Figs. 5 and 6 of the drawings, comprises a frame consisting of the track bars 14 connected by cross bars 16 and having connected uprights 17 reinforced by inclined braces 18. To said uprights 17 are secured curved or arc-shaped rockers 19 adapted to rock on inclined supporting and track or guide bars 20 forming offset portions of the first mentioned inclined track and supported by upright frames 21 which are similar to the frame 13. In order to prevent the rockers 19 from slipping upon the inclined track bars 20 cog rails 22 are arranged upon the later and co-acting cog teeth 23 are provided upon the rockers, but it will be understood that pins, small rods, chains or any other equivalent devices may be substituted for the meshing cog teeth. The upper ends of the rockers 19 project rearwardly or beyond the uprights 17 to provide hook-shaped stops 24 which take over the upper edge of the front end of the box 1 when the latter is drawn up upon the tilting or rocking support 15 against the uprights 17. The box 1 is retained upon the support 15 as the latter tilts by the engagement of the axle or shaft 10 of the rear track wheels 7 with the offst end of a retaining member 25 preferably in the form of a spring secured at one end to the support 15.

The dumping box 1 is drawn up the inclined track 5 onto the support 15 and the latter is tilted by means of a hoisting rope or cable 26 passed around a pulley 27 and a pulley block 28 detachably connected to the free end of a cord or cable 29, which latter extends over the top of the box 1, around a leverage bar 30 and has its lower end secured at 31 to the center of the bottom edge of the rear end of the box. Said block 30 is secured to the upper edge of said front end of the box, as clearly shown in Fig. 1. Both stretches of the cable 26 pass around guide pulleys 32 suitably journaled in a supporting frame 33 arranged upon the extended upper ends of the track bars 20, which ends of the latter are supported by an inclined frame 34. One end of the cable 26 is secured to a pulley block 35 and its other end passes around a pulley 36 in said block and may have a double tree or other draft connection attached to it. The block 35 is anchored by a cable 37 which is attached to one of the upright frames 21 and which serves as a brace for the frame 34, as shown in Fig. 1.

For the purpose of cushioning the dumping box 1 and automatically righting the same after it has discharged its contents, a cushioning device 38 is provided upon the frame 33, said device consisting of a bar slidable in a guide 39 and having a projecting lower end 40 against which the block 30 strikes when the box 1 swings to an inverted position indicated in dotted lines in Fig. 1. The movement of the bar 38 is cushioned by a coil spring 41 which surrounds it and which is confined between the guides 39 and a stop shoulder or head 42 on the upper extremity of the bar 38.

In order to permit the dumping box 1 to be readily loaded when on the horizontal portion 4 of the track, an inclined skid or chute 43 is arranged to one side of the track so that horse shovels or scrapers may be readily drawn up the same and discharged into the box. This loading operation may be greatly facilitated by connecting the two draft animals to the shovel on each side of the box 1 when the pulley block 28 is disconnected from the cable 29, and thereby draw the shovel or scraper up the skid or chute 43.

44 denotes hook-shaped stop arms provided upon the upper portion of the tilting support and adapted to engage stop pins 45 provided on the inner faces of the inclined track bars or members 20. These co-acting stop devices limit the tilting movement of the receptacle.

The operation of the invention is as follows: When the box 1 is on the horizontal portion 4 of the track, as shown in Fig. 9 and in dotted lines in Fig. 1, it may be readily loaded by drawing horse shovels or scrapers up the skid or chute 43 and dumping their contents into the box, as above described. After the box is loaded the cable or rope 29 is connected to the pulley block 28 and the free end of the cable 26 is then drawn upon by draft animals connected to it or by any power device. When this is done the box 1 will be drawn up the inclined portion 5 of the track and onto the tilting or rocking support 15 and when it strikes the uprights 17 on said support the latter will be caused to tilt or rock on the rockers 19 and track 20, the meshing cogs 23, 22 on said parts preventing the support from slipping, as it is tilted. As the box is inverted its contents drop into the manure spreader or wagon suitably placed beneath the device and the box is cushioned by the cushioning device 38, which also serves to return it to its righted or normal position. When the empty box and its support 15 drop back to the position shown in full lines in Fig. 1 the box will move by gravity down the inclined portion 5 of the track as soon as the cable 26 is slackened.

While the present embodiment of the invention is especially adapted for loading manure upon fertilizer or manure spreaders, it will be understood that it may be used for other purposes and it will also be understood that various changes in the form, proportion and minor details of construction may be resorted to without departing from the spirit of the invention.

Having thus described the invention what is claimed is:

1. In a loading device, the combination of an elevated inclined track, a dumping receptacle to travel up the track, a tilting support arranged at the upper end of the track and having a bottom portion and an upright portion, tracks upon the bottom portion of said support to form continuations of said inclined tracks, stops upon the upright portion of said support to engage the upper front portion of the receptacle, a holding means upon the bottom portion of said support to engage the bottom rear portion of the receptacle to retain the latter on said support, arc-shaped rockers secured on opposite sides of the upright and bottom portions of said tilting support, inclined tracks for said rockers arranged below and parallel with the first mentioned inclined tracks and independent of the same, co-acting means on the second mentioned inclined tracks and said rockers for preventing the latter from slipping on the former, a cable for removing the receptacle to the first mentioned track and tilting the same when on said support, and a cushioning device for limiting the tilting movement of said receptacle and returning it to its normal position.

2. In a loading device, the combination of an elevated inclined track, a dumping receptacle to travel up the track, means for moving said receptacle, a tilting support arranged at the upper end of the track to receive said receptacle, said support having track portions forming continuations of the inclined track and also having an upright portion, stops upon said upright portion of the support to engage the upper part of the front end of the receptacle, and a holding element upon said track portion of said tilting support and adapted to engage the rear portion of the bottom of the receptacle to retain it upon said support when the latter tilts.

3. In a loading device, the combination of an elevated inclined track, a dumping receptacle to travel up the track, means for moving said receptacle, a tilting support arranged at the upper end of the track to receive said receptacle, arc-shaped rocker bars fixed to said tilting support and on which the latter swings, inclined track bars for said rocker bars, hook-shaped stop arms upon the upper portion of said tilting support, and stop pins upon said track bars for engagement by said hook-shaped stop arms.

4. In a loading device, the combination of an elevated inclined track, a dumping receptacle to travel up the track, means for moving said receptacle, a tilting support arranged at the upper end of the track to receive said receptacle, a guide, a stop bar slidably mounted in said guide and carrying a projection to be engaged by said receptacle when inverted and a cushioning spring arranged on said stop bar for cushioning the receptacle and returning the latter to its righted position.

In testimony whereof I hereunto affix my signature in the presence of two witnesses.

ROY C. GLISE.

Witnesses:
J. P. JOHNSON,
H. H. HAMMER.